United States Patent [19]

Matsumoto et al.

[11] 4,025,399

[45] May 24, 1977

[54] IMAGE RECORDING MEMBER

[75] Inventors: Masakazu Matsumoto; Katsuhiko Nishide, both of Yokohama; Akemi Shimosawa, Tokyo, all of Japan; Kikuo Kinjo, deceased, late of Tokyo, Japan, by Ayako Kinjo, legal successor

[73] Assignee: Canon Kabushiki Kaisha, Tokyo, Japan

[22] Filed: Apr. 7, 1975

[21] Appl. No.: 565,585

[30] Foreign Application Priority Data

| | | |
|---|---|---|
| Apr. 8, 1974 | Japan | 49-39626 |
| Apr. 8, 1974 | Japan | 49-39627 |
| Apr. 8, 1974 | Japan | 49-39628 |
| Apr. 10, 1974 | Japan | 49-41194 |
| Apr. 10, 1974 | Japan | 49-41195 |
| Apr. 10, 1974 | Japan | 49-41196 |

[52] U.S. Cl. .................................. 204/2; 346/76 R; 346/135; 427/150

[51] Int. Cl.$^2$ .................... B41M 5/20; G01D 15/34

[58] Field of Search .................. 204/2; 96/1.5, 1 E; 427/121, 126, 146, 148, 150, 145; 346/76 R, 135, 74 E

[56] References Cited

UNITED STATES PATENTS

| | | | |
|---|---|---|---|
| 3,772,159 | 11/1973 | Sakata et al. | 204/2 |
| 3,792,481 | 2/1974 | Nagashima | 346/135 |
| 3,816,838 | 6/1974 | Higaki | 346/135 |
| 3,843,384 | 10/1974 | Adachi et al. | 346/135 |
| 3,864,684 | 2/1975 | Shimuzu | 427/145 |
| 3,875,023 | 4/1975 | Sekine | 346/135 |
| 3,937,864 | 2/1976 | Kohmura et al. | 427/150 |

*Primary Examiner*—T. M. Tufariello
*Attorney, Agent, or Firm*—Fitzpatrick, Cella, Harper & Scinto

[57] ABSTRACT

An image recording member comprises a substrate and a recording layer containing a conductive agent, a leuco base, and a phenol compound.

24 Claims, 3 Drawing Figures

IMAGE RECORDING MEMBER

BACKGROUND OF THE INVENTION

1. Field of the Invention

The present invention relates to an image recording member for recording images by application of electrical current and further to a process for recording images.

2. Description of the Prior Art

Recording of electrical signals as images has been increasing from year to year with the development of facsimile, printers and recorders. Heretofore, electrical discharge recording and electrolyte recording systems have been mainly used for such purpose, but these conventional systems suffer from the generation of bad odor and dust upon recording, limited handling due to the wet system and low recording image quality.

Japanese Pat. Publication No. 22341/1963, Japanese Patent Application Laid-open Nos. 101935/1973 and 122746/1974, and Japanese Patent Publication No. 46953/1974 disclose electric conduction recording systems producing images by applying electric current to a recording member having a recording layer containing a metal compound capable of forming color by electric reduction dispersed in a matrix or a recording member having a recording layer containing a color forming agent capable of coloring by heat and a conductive agent, and these electric conduction recording systems have been practically used. These recording systems are better than electrical discharge recording and electrolyte recording systems because the electric conduction recording systems give less odor and dust and are easy in handling due to their drying nature.

As a color forming agent colored by heat, there has been known a combination of a leuco base and an acidic substance. The color formation is caused by chemical reaction of the leuco base with the acidic substance. In general, a finely divided leuco base and an acidic substance are dispersed in a matrix and a heat image is applied thereto to melt one or both of them and cause contacting therebetween resulting in color formation. This technique has been used in conventional heat-sensitive recording and the image formation is effected by bringing a heat source such as a thermal head and the like into contact with a surface of a heat-sensitive recording paper having a recording layer containing a leuco base and an acidic substance dispersed in a matrix. Further, Japanese Pat. application Laid-open Nos. 101935/1973 and 122746/1974 and Japanese Pat. Publication No. 46953/1974 disclose an electric conduction recording system utilizing a heat-sensitive color forming agent composed of the above-mentioned leuco base and acidic substance. This process comprises applying electric current through a conductive agent to a recording layer composed of the above mentioned leuco base and acidic substance and further, the conductive agent, dispersed in a matrix, and thereby generating partly heat, which causes color-developing of the color forming agent. A disadvantage of this process is the coexistance of a conductive agent as well as the leuco base and the acidic substance in the recording layer different from a usual heat-sensitive recording. In other words, the coexistance of the color forming agent composed of the leuco base and acidic substance together with a conductive agent results in a remarkable unstable state as compared with a heat-sensitive paper which does not contain any conductive agent. The above mentioned conduction recording member has disadvantages such as low shelf life of the white paper, increased coloring of the background as the time lapses, and low recording density of the white recording paper with the lapse of time. These changes with the lapse of time are remarkably accelerated by light, heat and humidity. On the other hand, the recorded image is also subjected to lowering of its image density and changing of color with the lapse of time. The color changing and fading of images are markedly accelerated by human excretion as well as light, heat and humidity. Such tendency is also observed in the case of heat-sensitive recording papers which do not contain any conductive agent to some extent, but such remarkable changes are caused by the presence of the conductive agent affecting the color forming agent. Though the detailed mechanism which increases fog and accelerates color changing and fading is not clear, it seems sure that the conductive agent affects them to a great extent since a system containing no conductive agent is not subjected to such problem so much.

As usual conductive agent, there are metal compounds such as zinc oxide, copper iodide, tin oxide and the like, metal powder, compounds containing zeolitic water such as zeolite mineral, organic high polymer electrolytes and inorganic electrolytes. The above mentioned problem is caused more or less even if any conductive agent is used.

Among these conductive agents, metal compounds, metal powders, and zeolitic minerals used as pigment have some active points on the surface of the particles and the catalytic effect of the active points accelerates chemical reactions such as oxidation, reduction, decomposition and the like, of the leuco base, acidic substance and dye after being colored. As the result, it is considered that lowering of color forming density and formation of fog are caused by substantial decrease of the coloring agent or formation of unnecessary color forming agents. Further, when electrolytes are used as a conductive agent, the mechanism is different somewhat, but as the result of ion exchange and salt forming bonding of leuco base, acidic substance or dye after coloring, there seems to be caused color changing and fading. This mechanism is only an estimation, but anyway when a conductive agent is present, color changing and fading occur disadvantageously.

SUMMARY OF THE INVENTION

An object of this invention is to provide an improved image recording member free from color changing and fading, particularly used for conduction recording.

Another object of this invention is to provide an image recording member of excellent storage stability.

A further object of this invention is to provide an image recording member capable of corresponding to a fine change of electric conduction and giving excellent recording image quality and excellent reproducibility of image tone.

Still another object of this invention is to provide an image recording member of easy handling.

A still further object of this invention is to provide a process for conduction recording production excellent images.

According to the present invention, there is provided an image recording member which comprises a substrate and a recording layer overlying the substrate and containing a conductive agent, a binder, a leuco base, and at least one phenol compound selected from the class of (I) phenolic resin having a softening point of from 40°to 200° C obtained by reacting a phenol compound having, in one molecule, at least one phenolic hydroxy group, and at least two unsubstituted positions at the ortho and/or para positions as to the phenolic hydroxy group, with at least one bonding agent selected from the class of lower aliphatic aldehydes and derivatives thereof, lower alkyl vinyl ethers, bifunctional condensing agents, and a cross linking agent containing sulfur, II. phenol compound containing, in one molecule, one or more of —S—, —S—S—, $—SO_2—$, and —SO— bonding portion and being solid at normal temperature and capable of being liquified or vaporized at a temperature higher than 50° C and III. phenol compound having, in one molecule, one or two phenolic hydroxy groups and at least one alkyl moiety containing 4–30 carbon atoms and melting point of from 40°to 200° C.

According to another aspect of the present invention, there is provided a process for conduction recording which comprises bringing a stylus into contact with a recording layer containing a conductive agent, a leuco base, a phenol compound and a binder and provided on a substrate having a conductive layer, setting a return electrode on the conductive layer and applying electric current to the recording layer through the stylus to form images, or bringing a stylus into contact with said recording layer provided on a substrate, setting a return electrode on the recording layer and applying electric current to the recording layer through the stylus to form images.

DESCRIPTION OF THE PREFERRED EMBODIMENTS

Figure 1:
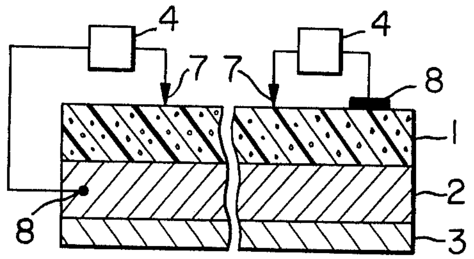
FIG. 1, FIG. 2 and FIG. 3 schematically illustrate the structure of an image recording member of the present invention and a recording method.

The present invention will be described by referring to the drawing.

Figure 2:
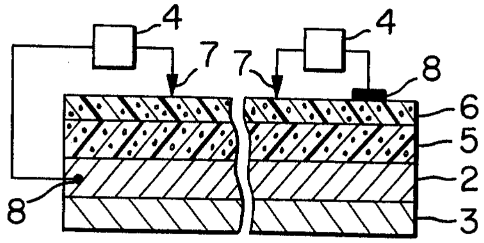
Figure 3:
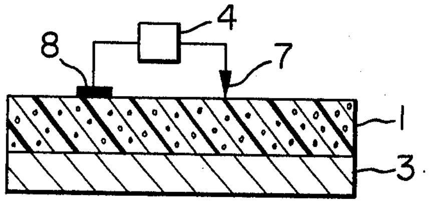

Referring to FIG. 1, a recording layer 1 is provided on a conductive layer 2 overlying a substrate 3. The recording layer 1 contains at least a conductive agent, leuco base, phenol compound and binder (a color developing accelerating agent may be added thereto). The image recording member in FIG. 2 is a modification of that in FIG. 1 and the recording layer is composed of a conduction layer 5 containing mainly a conductive agent and an image forming layer 6 containing mainly a color forming agent. FIG. 3 is a further embodiment of an image recording member having a substrate 3 and a recording layer 1 overlying the substrate. In the drawing, reference numerals 4, 7 and 8 denote a power source, a recording needle (stylus) and a return electrode. The return electrode is set on conductive layer 2 or recording layer 1. The polarity given to the stylus may be positive or negative and AC.

In the following, various components constituting each recording layer are described. (I) Conductive agent The conductive agent used in the present invention imparts conductivity to the matrix. The conductive agent may be metals, metallic vapor-deposited members, metal oxides, metal sulfides, metal phosphides, metal halides, alloys, carbon compounds, clay minerals, zeolitic minerals, which may be in a form of powder, and conductive polymers.

Representative conductive agents are powders of metal such as silver, gold, aluminum, nickel, cobalt, tin, bismuth, cadmium, indium and the like, powders composed of the above-mentioned metals vapor-deposited on a carrier such as alumina and silica, metal oxides such as titanium oxide, zinc oxide, lead oxide, tin oxide, calcium oxide, nickel oxide, indium oxide, tinindium oxide, molybdenum oxide, tungsten oxide and the like, metal sulfides such as zinc sulfide, calcium sulfide, copper sulfide, $Cd_4GeS_6$, $Cd_4SiS_6$, $Zn_4GeS_6$, $Zn_4SiS_6$ and the like, metal phosphides such as aluminum phosphide, gallium aluminum phosphide, gallium phosphide and the like, metal halides such as copper chloride, silver chloride, silver bromide, silver iodide, thallium chloride, thallium iodide, lead chloride, cuprous iodide and the like, alloys such as zinc-selenium, zinc-tellurium-selenium, magnesium-tellurium and the like, carbon compounds such as silicon carbide, carbon fluoride and the like, clay minerals such as montmorillonite, kaolinite and the like, zeolites such as faujasite, mordenite synthetic zeolite and the like, and conductive polymers such as poly-4-vinylbenzyltrimethylammonium chloride, sodium polymethacrylate and the like.

Zeolites, natural or synthetic, used in the present invention may be classified as follows:

| | |
|---|---|
| (1) Analcime Group: | |
| Analcite | $NaAlSi_2O_6 . H_2O$ |
| Pollucite | $(Cs,Na)AlSi_2O_6 . xH_2O$ (x<10) |
| Viscite | $Ca_{10}Na_2Al_{10}Si_6P_{10}(H_3)_{12}(H_2O)_{16} O_{96}$ |
| Kehoesite | $Zn_{5.5}Ca_{2.5}Al_{16}P_{16}(H_3)_{16}(H_2O)_{32}O_{96}$ |
| (2) Sodalite Group: | |
| Hydrosodalite | $Na_8(Al_6Si_6O_{12})(OH)_2$ |
| Faujasite | $Na_{28.6}Ca_{14.8}(Al_{57.6}Si_{134.4}O_{384})262 . 3H_2O$ |
| Molecular Sieve *A | $Na_{12}(Al_{12}Si_{12}O_{24})Na AlO_2 . 29H_2O$ |
| Molecular Sieve *X | $Na_2(Al_2Si_{2.8}O_{9.6}) . xH_2O$ (x=6) |
| Molecular Sieve *Y | $Na_2O . Al_2O_3 . 3\sim6 SiO_2 . xH_2O$ |
| Molecular Sieve* SK | substantially identical to faujasite |
| *Synthetic Zeolite manufactured by Union Carbide Co. | |
| (3) Chabazite Group: | |
| Chabazite | $(Ca,Na_2)Al_2Si_4O_{12} . 6H_2O$ |
| Gmelinite | $(Na_2, Ca)Al_2Si_4O_{12} . 6H_2O$ |
| Erionite | $(Ca,Mg . Na_2 . K_2) . Al_2Si_4O_{12} . 6H_2O$ |
| Levynite | $Ca(Al_2Si_4O_{12}) . 6H_2O$ |
| Molecular Sieve *R | the same as Chabazite |
| Molcular Sieve *S | the same as Gmelinite |
| Molecular Sieve *T | the same as Elionite |
| (4) Natrolite Group: | |
| Natrolite | $Na_2(Al_2Si_3O_{10}) . 2H_2O$ |
| Mesolite | $Na_2Ca_2(Al_6Si_9O_{30}) . 8H_2O$ |
| Scolecite | $Ca(Al_2Si_3O_{10}) . 3H_2O$ |
| Thomsonite | $NaCa_2(Al_5Si_5O_{20}) . 6H_2O$ |
| Edingtonite | $Ba(Al_2Si_3O_{10}) . 4H_2O$ |
| Gonnardite | $Na_2Ca(Al_4Si_8O_{20}) . 6H_20$ |
| Rhodesite | $KnaCa_2(H_2Si_8O_{20}) . 5H_2O$ |
| Mountainite | $KNa_2Ca_2(HSi_8O_{20}) . 5H_2O$ |
| (5) Harmotome Groups: | |
| Harmotome | $Ba_2(Al_4Si_{12}O_{32}) . 4H_2O$ |
| Phillipsite | $(KxNa_{1-x})_5Al_5Si_{11}O_{32} . 10H_2O$ |
| Gismondite | $Ca(Al_2Si_2O_8) . 4H_2O$ |
| Molecular Sieve *B | $Na_2(Al_2Si_3O_{10}) . 5H_2O$ |
| Garronite | $NaCa_{2.5}(Al_3Si_5O_{16})_2 . 13.5H_2O$ |
| (6) Mordenite Group: | |
| Mordenite | $Na(AlSi_5O_{12}) . 3H_2O$ |
| D'achiardite | $(Na_2Ca)_2Al_4Si_{20}O_{48}. 12H_2O$ |
| Ferrierite | $Na_{1.5}Mg_2(Al_{5.5}Si_{30.5}O_{72}) . 18H_2O$ |
| Zeolon** | the same as Mordenite |
| **manufactured by Norton Co. | |
| Some zeolites of non-determined structure as shown below. | |
| Heulardite | $Ca(Al_2Si_7O_{18}) . 6H_2O$ |
| Clinoptilotite | $Na_{0.95}K_{0.30}Ca_{0.5}(Al_{1.35}Si_{7.05}O_{18}) . 5H_2O$ |
| Stilbite | $Ca(Al_2Si_7O_{18}) . 7H_2O$ |
| Epistilbite | $Ca(Al_2Si_6O_{16}) . 5H_2O$ |

-continued

| | |
|---|---|
| Brewsterite | $(Sr,Ba,Ca)Al_2Si_6O_{16} \cdot 5H_20$ |
| Laumontite | $Ca(AlSi_2O_6) \cdot 4H_2O$ |
| Yugawaralite | $Ca(Al_2Si_5O_{14}) \cdot 3H_2O$ |
| Paulingite | $(K,Ca,Na)_{120}[(Al,Si)_{580}O_{1160}] \cdot 690H_2O$ |
| Aschcroftine | $[KNa(Ca,Mg,Mn)]_{120}$ $(Al_{160}Si_{200}O_{720}) \cdot 320H_2O$ |
| Bikitaite | $LiAlSi_2O_6 \cdot H_2O$ |

All the above compounds are applicable to the invention. Zeolite-like compounds used in the present invention include the following minerals.

1. Zeolite-like silicate

They are not classified into Zeolite, but contain zeolitic water.

| | |
|---|---|
| Beryl | $Al_2Be_3[Si_6O_{18}] \cdot nH_2O$ |
| Cordierite | $Mg_2Al_3[AlSi_5O_{18}] \cdot nH_2O$ |
| Milarite | $KCa_2AlBe_2[Si_{12}O_{30}]O.5H_2O$ |
| Osumilite | $(K,Na,Ca)(Mg,Fe)_2(Al,Fe)_3$ $[(Si,Al)_{12}O_{30}] \cdot H_2O$ |
| Hydrated | |
| Nepheline | $KNa_3(Al_4Si_4O_{16}) \cdot nH_2O$ |
| Cancrinite | $Na_6Ca_6(Al_6Si_6O_{24})CO_3 \cdot 3H_2O$ |
| Buddingtonite | $NH_4AlSi_3O_8 \cdot 0.5H_2O$ |
| (2) Other zeolite-like compounds | |
| I) Germanate | $M_3[HGe_4(GeO_4)_3O_4] \cdot 4H_2O$: M is a metal ion. |
| II) Phosphate, Arsenate, | |
| Scorodite | $FeAsO_4 \cdot 2H_2O$ |
| Pharmacosiderite | $K[Fe_2(OH)_4(AsO_4)_3] \cdot 6\sim7H_2O$ |
| III) Water containing metal oxide | |
| Psilomelane | $(Ba, H_2O)_2, Mn_5O_{10}$ |
| IV) Three structure complex | |
| Prussian blue | $M_3[Fe(CN)6]_2 \cdot 12H_2O$, (M=Mn,Fe,Co,Ni,Zn,Cd) |
| Weddellite | $CaC_2O_4 \cdot (2 + x)H_2O$, $(x \leq 0.5)$ |

II Leuco base

The leuco base is usually a colorless or lightly colored solid which is colored when brought into contact with an acidic substance used in this invention. The leuco base includes known dye leuco bodies such as triphenylmethane series, fluoran series, phenothiazine series, auramine series, spiropyran series and the like.

III Phenol compound

The phenol compound prevents color changing and fading of the colored images or increases storage stability of the recording member, and causes a color forming reaction when brought into contact with the leuco base as mentioned above.

The phenol compounds include the following phenol compounds (1), (2) and (3) in detail.

1 Phenolic resin having a softening point of from 40 to 200° C obtained by reacting a phenol compound having, in one molecule, at least one phenolic hydroxy group and at least two unsubstituted positions ortho and/or para to the phenolic hydroxy group, with at least one bonding agent selected from the class of lower aliphatic aldehydes and derivatives thereof, lower alkyl vinyl ethers, bifunctional condensing agents, and a cross linking agent containing sulfur.

2. Phenol compound containing, in one molecule, one or more of —S—, —S—S—, —$SO_2$— and —SO— bonding portion and being solid at normal temperature and capable of being liquified or vaporized at a temperature higher than 50° C, 3. Phenol compound having, in one molecule, one or two phenolic hydroxy groups and at least one alkyl moiety containing 4–30 carbon atoms and a melting point of from 40° to 200° C.

Representative phenol compounds are as shown below.

a. Phenolic resins obtained by the polycondensation of 4, 4'-isopropylidene diphenol or 4, 4'-sec-butylidene diphenol with formaldehyde or acetaldehyde in an aqueous alcohol in the presence of a hydrochloric acid catalyst, washing the resulting oily product and reprecipitating with water.

b. Phenolic resins having a softening point of from 40' to 200° C obtained by reacting a phenol compound having, in one molecule, at least one phenolic hydroxy group and having at least two unsubstituted positions ortho and/or para to the phenolic hydroxy group with at least one bonding agent selected from the class of lower aliphatic aldehydes and derivatives thereof, lower alkyl vinyl ethers, bifunctional condensing agents and cross linking agents containing sulfur. The softening point here is that determined by ring and ball test.

Representative starting materials therefor are, for example, as shown below.

1. Phenol compounds

Phenol, m-cresol, 3,5-xylenol, 4,4'-isopropylidenediphenol, 4,4'-sec-butylidenediphenol, 4,4'-ethylidenediphenol, 4,4'-cyclohexylidenediphenol, 4,4'-(1-methylpentylidene)diphenol, 4,4'-(1-ethylbutylidene)diphenol, 4,4'-isopropylidenedicatechol, 4,4'-ethylenediphenol, 4,4'-hexamethylenediphenol, 4,4'-benzylidenediphenol, 4,4',4''-methyne-tris-phenol, 4,4'-bishydroxyphenyl sulfide, 4,4'-bishydroxyphenyl disulfide, 4,4'-bishydroxyphenyl sulfone, 4,4'-dihydroxybenzophenone, 2,2'-isopropylidenediphenol, 2,2'-sec-butylidenediphenol, 2,2'-ethylenediphenol, 2,2'-bishydroxyphenyl sulfide, 2,2'-bishydroxyphenyl disulfide, 2,4'-isopropylidenediphenol, bis-(2,4'-dihydroxyphenyl)sulfide and the like.

2. Cross linking agent:

Formaldehyde, acetaldehyde, propionaldehyde, butyladehyde, acrolein, glyoxal, malonaldehyde, methylglyoxal, glycol aldehyde, chloral, paraformaldehyde, trioxane, paraaldehyde, acetals, methyl vinyl ether, ethyl vinyl ether, sulfur, sulfur monochloride, sulfur dichloride, sulfur pentachloride, sulfur dibromide, $\alpha,\omega$-dihalogenated hydrocarbon and the like.

c. Sulfur containing phenol compounds:

3-methyl-4-hydroxyphenyl ethyl sulfide, 2-hydroxydiphenyl sulfide, 2-hydroxyphenyl-2',4'-dichlorophenyl sulfide, 4-hydroxyphenyl-2'-chlorobenzyl sulfide, 3-methyl-4-hydroxyphenylbenzyl sulfide, 4,4'-dihydroxythiobenophenone, ethyl N-(4-hydroxyphenyl) dithiocarbamate, thioacetic acid-S-4-hydroxyphenyl ester, 4,4'-dihydroxydiphenyl sulfide, 2,4'-dihydroxydiphenyl sulfide, 2,2'-dihydroxydiphenyl sulfide, 4,4'-dihydroxydiphenyl disulfide, 4,4'-dihydroxydiphenyl sulfone, 4,4'-dihydroxydiphenyl sulfoxide, 2,2'-dihydroxy-5,5-dichlorodiphenyl sulfide, 2,2'-dichloro-4,4'-dihydroxydiphenyl sulfide, 3,3',5,5'-tetrachloro-2,2'-dihydroxyphenyl sulfide, 2,2'-dihydroxy-5,5'-dimethyldiphenyl sulfide, 2,2'-dimethyl-5,5'-di-tert-butyl-4,4'-dihydroxydiphenyl sulfide, 2,2',4,4'-tetrahydroxydiphenyl sulfide, 2,2',4,4'-tetrahydroxydiphenyl disulfide, 2,2',4,4'-tetrahydroxydiphenyl sulfone, 2,2',4,4'-tetrahydroxydiphenyl sulfoxide, 2,2',4,4'-tetrahydroxy-5,5'-dichlorodiphenyl sulfide, 2,2',4,4'-tetrahydroxy-5,5'-diethyldiphenyl sulfide, 4,4'-di(p-hydroxyphenyl) diphenyl sulfide, 4,4'-di(p-hydroxyphenyl)-diphenyl disulfide, 2,2'-dihydroxy-6,6'-dinaphthyl sulfide, 2,2'-dihydroxy-6,6'-dinaphthyl disulfide, 4,4'-dihydroxydibenzyl sulfide, 4,4',4''-trihydroxytriphenylmethyl ethyl sulfide, bis-(4,4',4''-trihydroxytriphenylmethyl) disulfide, 2,2'-di(p-hydroxyphenyl) ethyl-n-butyl sulfide, 5,6-dihydroxy-2-methyl benzothiazole, 5-hydroxy-1,4-dithianaphthalene, 4-hydroxyphenyl-1'-phenyl-5'-tetrazolyl sulfide, 1-hydroxy-4-(1-phenyl-5-tetrazolylthio) naphthalene, and the like.

d. Other phenol compounds:

| Phenol Compounds | m.p. (° C) |
|---|---|
| 2-n-butylphenol | 125 |
| 4-n-butylphenol | 120 |
| 4-iso-amylphenol | 93 |
| 4-tert-octylphenol | 84 |
| 4-n-nonylphenol | 40 |
| 4-n-dodecylphenol | 65 |
| 4-n-heptadecylphenol | 96 |
| 4-n-amylresorcinol | 73 |
| 4-n-hexylresorcinol | 69 |
| 4-tert-octylresorcinol | 64 |
| 3-n-pentadecylcatechol | 60 |
| 4-n-butoxyphenol | 65 |
| 4-n-octyloxyphenol | 60 |
| n-butyl 4-hydroxybenzoate | 72 |
| n-lauryl 4-hydroxybenzoate | |
| 4-n-octylphenyl salicylate | 75 |
| n-hexadecyl 2-hydroxy-2-naphthoate | 73 |
| 1-[4-hydroxyphenyl]-pentanone-(3) | 87.5 |
| 4-hydroxyphenyl octyl ketone | 98 |
| 4-(ω-phenyl-n-octyl)phenol | 81 |
| 4-n-octylphenyl phenol | 64 |
| 4-n-laurylphenyl phenol | 82 |
| 4-n-laurylphenyl-4-hydroxyphenyl butane | 182 |
| 2-benzoyl-5-n-octyloxyphenol | 45 |
| 1,10-di(4-hydroxyphenyl)decane | 142 |
| 4,4'-(1-methyl-n-heptylidene)diphenol | 88 |
| 4,4'-(1-methyl-n-octylidene)diphenol | 56 |
| 4,4'-(1-n-butyl-n-pentylidene)diphenol | 170 |
| 4,4'-(1-n-pentyl-n-hexylidene)diphenol | 193 |
| 3,3'-di-n-butyl-4,4'-isopropylidene diphenol | 101 |
| 3,3'-di-n-butyl-4,4'-sec-butylidene dephenol | 146 |
| 3,3'-di-n-butyl-4,4'-bishydroxyphenyl sulfide | 129 |

In addition, according to the present invention, a color developing accelerating agent such as, for example, weak acids, may be added to the recording layer to prevent color changing and fading of the colored image, enhance the storage stability, and increase the color density. (IV) Color developing accelerating agents Representative color developing accelerating agents used in this invention can be classified as shown below.

i. Phenols, biphenols, diphenol methanes of the following formulas and derivatives thereof:

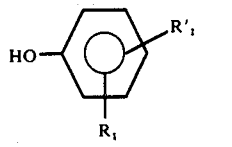

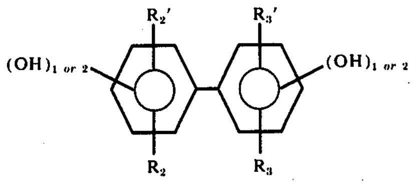

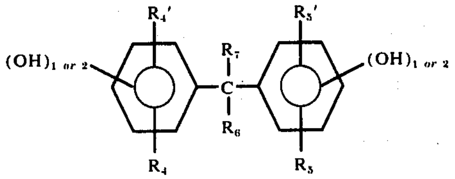

where $R_1$, $R_1'$, $R_2$, $R_2'$, $R_3$, $R_3'$, $R_4$, $R_4'$, $R_5$, $R_5'$, $R_6$ and $R_7$ are similar or dissimilar, selected from the class of hydrogen, $C_1$–$C_3$ alkyl, alkoxy, acyl, alkylamino, dialkylamino, amino, nitro, and halogen.

Examples of the above mentioned compounds are: 4-tert-butylphenol, 4-hydroxydiphenoxide, α-naphthol, β-naphthol, methyl 4-hydroxybenzoate, 4-hydroxyacetophenone, 4-tert-octylcatechol, 2,2'-dihydroxydiphenyl, 4-hydroxydiphenyloxide, 2,2'-methylene-bis(4-chlorophenol), 2,2'-methylene-bis(4-methyl-6-tert-butylphenol), 4,4'-isopropylidene diphenol, 4,4'-isopropylidene-bis(2-chlorophenol), 4,4'-isopropylidene bis(2,6-dibromophenol), 4,4'-isopropylidene bis(2-methylphenol), 4,4'-isopropylidene bis(2,6-dimethylphenol), 4,4'-isopropylidene bis(2-tert-butylphenol), 4,4'-sec-butylidene bis(2-methylphenol), 4,4'-cyclohexylidene diphenol, 4,4'-cyclohexylidene bis(2-methylphenol), 2,2'-thiobis(4,6-dichlorophenol), and 4,4'-(1-methyl-n-hexylidene)diphenol. ii. Clay minerals Aluminum oxide, Japanese acid clay, kaolin, silica, etc. iii. Organic acids Aliphatic carboxylic acids, aromatic carboxylic acids, etc.

As the binders, there may be used water-soluble synthetic high polymers, natural high polymers and high polymers of aqueous emulsion type.

Representative binders are polyvinyl alcohol, polyvinyl acrylamide, casein, gelatin, starch and derivatives thereof, cellulose, methyl cellulose, hydroxyethyl cellulose, gum arabic, sodium alginate, zinc sodium sodium zinc caseinate, carboxymethyl cellulose, pectin, copolymer of styrene and maleic anhydride, copolymer of vinyl methyl ether and maleic anhydride, polyarylates and copolymers of acrylates, polyethylene oxide, styrene-butadiene series emulsions, vinyl chloride series emulsions, and vinyl acetate series emulsions.

The image recording member of the present invention may be prepared, for example, by mixing and uniformly dispersing 2.5–25 parts, preferably 3–15 parts, by weight of the conductive agent, 0.25–5 parts, preferably 0.5–2 parts, by weight of the leuco base, 0.25–15 parts, preferably 0.5–6 parts, by weight of the phenol compounds, and 0.5–10 parts, preferably 0.8–5 parts, by weight of the binder (when a color developing accelerating agent is used, less than 10 parts, preferably less than 5 parts, by weight of the color developing accelerating agent per one part by weight of the phenol compound) and applying the dispersion to a substrate such as paper, resin film, glass plate, metal plate, paper having a metal foil, metal deposited paper, carbon conductive paper.

In the present invention, a specific phenol compound is used as an acidic substance in the color forming system and thereby color changing and fading of the recorded image can be prevented and storage stability remarkably improved.

The image recording member of the present invention may be used for recording such as, for example, receiving signal of facsimile, output of computer, its terminal equipments and data of various kinds of measuring apparatus for industry, medical treatment, and business.

The invention will be understood more readily by reference to the following examples, however, these examples are intended to illustrate the invention and are not to be construed to limit the scope of the invention.

EXAMPLE 1

The examples for illustrating the preparation of phenol compounds according to the present invention are given below.

PREPARATION EXAMPLE 1: PHENOL RESIN-A

| | | |
|---|---|---|
| 4,4'-isopropylidenediphenol | 68.4 | gr. |
| Formaldehyde (a 37% aqueous solution) | 45.0 | gr. |
| Concentrated hydrochloric acid | 7.5 | ml. |
| Ethanol | 90 | ml. |
| Water | 67.5 | ml. |

The above-mentioned ingredients were placed in a flask, mixed and dissolved. The mixture was refluxed with heating on a hot bath for a period of predetermined time and then allowed to cool. The resulting oily material was washed with a mixed solvent of methanol and water (4:60) several times and then it was dissolved in 100 ml of methanol. This solution was poured into 2 liters of water to obtain white powder of a phenolic resin. The phenolic resin was recovered by filtration, dried. The yield was 56–68 gr. The phenolic resin thus prepared is hereinafter called "Phenol resin-A".

PREPARATION EXAMPLE 2: PHENOL RESIN-B

| | | |
|---|---|---|
| 4,4'-sec-butylidenediphenol | 72.6 | gr. |
| Acetaldehyde | 24.4 | gr. |
| Concentrated hydrochloric acid | 7.5 | ml. |
| Ethanol | 90 | ml. |
| Water | 95 | ml. |

The above-mentioned ingredients were used to repeat the same procedure as that in Preparation Example 1 so that substantially white powder of a phenolic resin was obtained. The phenolic resin thus prepared is hereinafter called "Phenol resin-B".

| | |
|---|---|
| Crystal Violet Lactone | 1 gr. |
| Synthetic zeolite (supplied by Union Carbide Co., Molecular Sieve 13X) | 5 gr. |
| Rutile type titanium oxide | 1 gr. |
| Water | 13 gr. |

The composition of the above-mentioned ingredients was kneaded in a ball mill for two days and nights to prepare a dispersed liquid of Component-A.

| | | |
|---|---|---|
| 4,4'-isopropylidenediphenol | 1.5 | gr. |
| Phenol resin-A obtained in Preparation Example 1 (the softening temperature of 90° C) | 1.0 | gr. |
| Synthetic zeolite (supplied by Union Carbide Co., Molecular Sieve 13X | 5.0 | gr. |
| Polyvinyl alcohol (the polymerization degree of 1000, the saponification degree of 85%) | 2 | gr. |
| Water | 20.5 | gr. |

The composition of the above-mentioned ingredients was kneaded in a ball mill for two days and nights to prepare a dispersed liquid of Component-B.

Both dispersed liquids of Components-A and B were gently mixed and the resulting mixture was coated onto an aluminum deposited paper by using a coating rod and dried to form an electric conduction recording layer thereon so that a recording paper was obtained. The recording paper thus prepared was subjected to recording. In such recording, a stylus was connected to the negative − electrode of a power source and the aluminum deposited layer of the recording paper was connected to the positive + electrode. A voltage of approximately 140 volts was impressed to cause the stylus to scan on the recording paper so that a blue image was obtained. Where the stylus and aluminum layer were connected to the positive and negative electrodes, respectively or when the power source of an alternating current was used, substantially the same image was obtained in each case.

The recordability of the recording paper thus prepared was found excellent in the recordability and, even when it was allowed to stand at 40° C and 80% RH for two months, both the physical property of its surface and recordability remained very good. Further, even when the recording paper having been subjected to recording was allowed to stand under the same condition, its quality did not change at all at the image region and the non-image region and the physical property of the surface remained excellent and further no change of the color was recognized.

In the foregoing, there has been shown the example using the Phenol resin-A having a softening point of 90° C. Meanwhile, various Phenol resins-A prepared under the various different polymerization conditions were separately used to prepare recording papers in the same manner as above.

The general evaluation of the recording papers thus prepared was made with respect to the change of the color of the formed image with the lapse of time, the surface physical property and recordability of the recording papers allowed to stand at 40° C and 80% RH for one month. When the recording paper having been subjected to recording was allowed to stand under the same conditions as above, the color change of the formed image with the lapse of time was observed. With respect to the surface physical property and the recordability, they were evaluated by comparing with those of the recording paper immediately after being prepared.

The results of the general evaluation are shown in Table 1.

Table 1

| Recording paper | Phenol resin-A | Time for polymerizing Phenol resin-A (hour) | Softening temperature (° C) | General evaluation |
|---|---|---|---|---|
| 1 | A-1 | 0.5 | 52 | ◎ |
| 2 | A-2 | 1.0 | 65 | ◎ |
| 3 | A-3 | 1.5 | 90 | ◎ |
| 4 | A-4 | 2.0 | 111 | ◎ |
| 5 | A-5 | 2.5 | 130 | ◎ |
| 6 | A-6 | 3.0 | 155 | O |
| 7 | A-7 | 5.0 | 180 | Δ |
| 8 | A-8 | 7.0 | — | X |
| Recording paper containing no phenol resin | | Allowed to stand at 40° C and 80% RH for 3 days | | Δ |
| | | Allowed to stand at 40° C and 80% RH for two weeks | | X |

◎ No change observed in the image color with lapse of time, the surface physical property and the recordability.
O Slight change observed in the same points.
Δ Considerable change observed.
X Extreme change observed.

EXAMPLE 2

Other examples for preparing phenol compounds according to the present invention are given below.

PREPARATION EXAMPLE 3: IPCS RESIN

| | | |
|---|---|---|
| 4,4'-isopropylidenedicatechol | 52.0 | gr. |
| Sulfur dichloride | 31.5 | gr. |
| Chloroform | 1800 | ml. |
| Acetone | 50 | ml. |

The above-mentioned ingredients were placed in a flask, mixed, dissolved and reacted with stirring at 50° C for a period of predetermined time and then allowed to cool. The whole solution was evaporated to dryness one time and the product was washed several times with a mixed solvent of water and alcohol (70:30), dissolved in 100 ml. of methanol and reprecipitated in 2 liters of water to obtain a phenolic resin of white powder tinged slightly with brown. The phenolic resin was recovered by filration and dried. The yield was 51 gr. The resulting resin is hereinafter called "IPCS resin".

PREPARATION EXAMPLE 4: BHSS RESIN

| | | |
|---|---|---|
| 4,4'-bishydroxyphenylsulfide | 21.8 | gr. |
| Sulfur | 9.6 | gr. |
| Sodium hydroxide | 4.0 | gr. |
| 1,2,4-trichlorobenzene | 300 | ml. |

The above-mentioned ingredients were mixed and reacted with stirring at 190° C for 4 hours. After cooling, an excess of the sulfur was removed and the reaction mixture was neutralized with a 30% aqueous solution of acetic acid. The resulting oil layer was distilled under reduced pressure to remove the solvent. Subsequently, the same treatment as in Preparation Example 1 was repeated to obtain a phenol resin of light brown powder. The phenol resin thus obtained is hereinafter called "BHSS resin".

In the meantime, 5 gr. of 1,3,3-tri-methylindolino-8'-methoxybenzopyrylspiran, 1 gr. of rutile type titanium oxide, 3 gr. of polyvinyl alcohol (the polymerization degree of 1000, the saponification degree of 85%) and 12 gr. of water were kneaded in a ball mill for two days and nights to prepare a dispersed light of Component-A.

Further, 8 gr. of IPCS resin (the softening temperature of 118° C), 1 gr. of rutile type titanium oxide, 3 gr. of polyvinyl alcohol (the polymerization degree of 1000, the saponification degree of 85%) and 12 gr. of water were kneaded for two days and nights to prepare a dispersed liquid of Component-B.

Both dispersed liquids of components-A and B were dispersed along with 1 gr. of aluminum powder and the resulting dispersed mixture was coated into an aluminum deposited paper in the same manner as in Example 1 to prepare a recording paper. An electrode for a return circuit was taken from the surface of the recording paper thus prepared by means of an aluminum plate and a DC voltage of approximately 100 volts was impressed between the electrode for a return circuit and a stylus (positive electrode) to cause the stylus to scan so that a reddish purple image was obtained. The stability of the image with the lapse of time was found to be excellent and, as the result of the preservation test at 40° C and 80% RH for one month, no decrease in the image density could be observed.

EXAMPLE 3

In a ball mill, 3 gr. of lactam of 9-p-nitroanilino-3,6-bis(diethylamino)-9-xanthenyl-o-benzoic acid, 1 gr. of rutile type titanium oxide, 9 gr. of poly-4-vinylbenzyltrimethyl ammonium chloride (ECR-34, trade name for a product of Dow Chemical Co., a 30% aqueous solution) and 7 gr. of water were kneaded for two days and nights to prepare a dispersed liquid of Component-A.

On the other hand, 8 gr. of BHSS resin (the softening temperature of 144° C) obtained in Preparation Example 4, 1 gr. of rutile type titanium oxide, 9 gr. of poly-4-vinylbenzyltrimethyl ammonium chloride (ECR-34, a trade name for a product of Dow Chemical Co., a 30% aqueous solution) and 7 gr. of water were kneaded in a ball mill for two days and nights to prepare a dispersed liquid of Component-B.

An electric conduction recording layer was formed on an aluminum deposited paper in the same manner as in Example 1 to prepare a recording paper. A stylus was connected to the negative electrode of the power source and the aluminum layer was connected to the positive electrode to cause the stylus to scan by applying a voltage of 140 volts so that a reddish purple image was obtained. The result of the preservation test conducted in the same manner as in Example 1 was found extremely excellent.

EXAMPLE 4

The recordability of various recording papers prepared by using various kinds of electrically conductive agents were tested as shown below.

The same procedure as in Example 1 was repeated except that the electrically conductive agents listed in Table 2 below were separately used in place of the synthetic zeolite to prepare recording papers. The recordability of the recording papers was evaluated to obtain the results as shown in Table 2.

Table 2

| Electrically conductive agent | Amount (gr.) | Recording voltage (volt) | Polarity of stylus | Recordability |
|---|---|---|---|---|
| Al | 1.0 | 110 | (+) | ◎ |
| ZnO | 5.0 | 180 | (+) | ◎ |
| $SnO_2$ | 4.0 | 130 | (+) | ◎ |
| ZnS | 5.0 | 150 | (−) | ○ |
| $Cu_2I_2$ | 4.0 | 130 | (+) | ◎ |
| AlP | 3.0 | 150 | (−) | ○ |
| SiC | 4.0 | 160 | A C | ○ |
| MgTe | 1.0 | 110 | A C | ○ |

Note:
◎ . . . very good
○ . . . good

In addition, a material selected from zeolite minerals and zeolite-analogous minerals listed in Table 3 below was used in place of Molecular Sieve 13X used in Example 1 to prepare a recording paper in the same manner s in Example 1. The recording paper was evaluated in accordance with the evaluating method described in Example 1 to obtain the results as shown in Table 3.

Table 3

| Zeolite mineral and zeolite analogous mineral | General evaluation |
|---|---|
| Faujasite | ◎ |
| Erionite | ○ |
| Analcite | Δ |
| Molecular Sieve SK-40*1 | ◎ |
| Zeolon*2 | ○ |
| Natrolite | ○ |

Table 3-continued

| Zeolite mineral and zeolite analogous mineral | General evaluation |
|---|---|
| Garronite | Δ |
| Clinoptilotite | Δ |
| Molecular Sieve 5A*3 | ○ |
| Gonnardite | ○ |

*1,3 trade names for the synthetic zeolite of Union Carbide Co.
*2 trade name for the synthetic zeolite of Norton Co.

EXAMPLE 5

In a ball mill, 5 gr. of Rhodamine B lactone, 25 gr. of zinc oxide rendered electrically conductive and 70 gr. of water were kneaded for two days and nights to prepare a dispersed liquid of Component-A.

On the other hand, 13 gr. of 2,2'-dihydroxy-5,5'-dichlorodiphenylsulfide, 20 gr. of zinc oxide rendered electrically conductive, 10 gr. of polyvinyl alcohol (the polymerization degree of 1000, the saponification degree of 85%) and 70 gr. of water were kneaded in a ball mill for two days and nights to prepare a dispersed liquid of Component-B.

These dispersed liquids of Components-A and B were treated in the same manner as in Example 1 to coat the resulting mixture onto an aluminum deposited paper so that a recording paper was prepared. Electric current was caused to flow in such a manner that a stylus was connected to the negative electrode, the aluminum layer was connected to the positive electrode and a voltage of approximately 120 volts was applied. As the result, a red good image was obtained.

In addition, the recording paper bearing the image was exposed to a white fluorescent light source at 5000 lux for 200 hours to carry the test with respect to the light resistance property. As a result of such test, the decrease in the density of the image was only about 15% and the ground color of the recording paper hardly turned yellow, and therefore, the light resistance property was found to be excellent.

EXAMPLE 6

The same procedure as that in Example 5 was repeated except that phenol compounds listed in Table 4 were separately used in place of 2,2'-dihydroxy-5,5'-dichlorodiphenylsulfide to prepare recording papers. The prepared recording papers were subjected to electric conduction recording and the light resistance property thereof was tested. The recording and exposure conditions were the same as those in Example 5.

Table 4

| No. | Phenol compound | Image density (*1) | Image density (*2) | Change of ground color |
|---|---|---|---|---|
| 1 | 4,4'-dihydroxydiphenyl-sulfide | 0.78 | 0.66 | No change |
| 2 | 4,4'-dihydroxydiphenyl-disulfide | 0.76 | 0.64 | No change |
| 3 | 4,4'-dihydroxydiphenyl-sulfone | 0.81 | 0.65 | Slightly turned yellow |
| 4 | 4,4'-dihydroxydiphenyl-sulfoxide | 0.79 | 0.65 | No change |
| 5 | 4-hydroxyphenyl-2'-chlorobenzylsulfide | 0.77 | 0.71 | No change |
| 6 | 4,4'-dihydroxythiobenzophenone | 0.77 | 0.62 | Slightly turned yellow |
| 7 | 2,2',4,4'-tetrahydroxy-diphenyldisulfide | 0.82 | 0.69 | No change |
| 8 | 4,4'-di(p-hydroxyphenyl) diphenylsulfide | 0.78 | 0.70 | No change |
| 9 | 5-hydroxy-1,4-dithio-naphthalene | 0.79 | 0.66 | Slightly turned light brown |
| 10 | 2,2'-dihydroxy-6,6'-dinaphthyldisulfide | 0.80 | 0.69 | No change |

Table 4-continued

| No. | Phenol compound | Image density (*1) | Image density (*2) | Change of ground color |
|---|---|---|---|---|
| Comparison material | 4,4'-isopropylidene-diphenol | 0.78 | 0.41 | Turned yellow |
| | 4,4'-cyclohexylidene-diphenol | 0.77 | 0.43 | Turned yellow |

*1 Measured immediately after recording.
*2 Measured after the image was exposed to a white fluorescent light source at 5000 lux for 200 hours.

EXAMPLE 7

In a ball mill, 3 gr. of lactam of 9-p-nitroanilino-3,6-bis-(diethylamino)-9-xanthenyl-o-benzoic acid, 1 gr. of rutile type titanium oxide, 9 gr. of poly-4-vinylbenzyltrimethyl ammonium chloride (ECR-34, a trade name for a product of Dow Chemical Co., a 30% aqueous solution) and 7 gr. of water were kneaded for two days and nights to prepare a dispersed liquid of Component-A.

Further, 8 gr. of 4,4'-di-n-butyl 2,2'-thio-bis (6-chlorophenol), 1 gr. of rutile type titanium oxide, 9 gr. of poly-4-vinylbenzyltrimethyl ammonium chloride (ECR-34, a trade name for a product of Dow Chemical Co., a 30% aqueous solution) and 7 gr. of water were kneaded in a ball mill for two days and nights to prepare a dispersed liquid of Component-B.

These dispersed liquids of Components-A and B were used to form an electric conduction recording layer on an aluminum deposited paper in the same manner as in Example 1 so that a recording paper was prepared. A stylus was connected to the negative electrode and the aluminum deposited layer was connected to the positive electrode to cause the stylus to scan on the recording paper by impressing a voltage of 140 volts so that a reddish purple image was obtained.

As the result of the preservation test conducted in the same manner as in Example 1, no deterioration of the property of the recording paper could be observed and the property was found very excellent.

In addition, when the compounds as mentioned below were used in place of the phenol compound, the same effect as above was observed.

2-benzoyl-5-n-octyloxyphenol,
4-n-octylphenylphenol,
4,4'-(1-methyl-n-hexylidene)diphenol,
4,4'-(1-methyl-n-hexylidene)diphenol,
4-n-butyl phenol,
4,4'-(1-n-pentyl-n-hexylidene)diphenol, and
4,4'-(1-n-butyl-n-pentylidene)diphenol

EXAMPLE 8

The effect due to the simultaneous use of a weak acid as a color developing accelerating agent was particularly tested as described below.

In the procedure for preparing a recording paper of Example 1, 4,4'-sec-butylidenediphenol was substituted for 4,4'-isopropylidenediphenol and the amount of each of 4,4'-sec-butylidenediphenol and Phenol resin A was varied as shown in Table 5 to prepare recording papers in the same manner. The recording papers thus prepared were separately subjected to electric conduction recording in the following manner. The aluminum deposited layer was connected to the positive electrode and a tungsten stylus of 0.2 mm in diameter was connected to the negative electrode to cause the stylus to scan on the recording paper at a linear density of 4 line/mm and a linear velocity of 70 cm/sec by impressing a voltage of approximately 150 volts.

The density of the image immediately after recording and the density of the image preserved at 40° C and 80% RH for one month after recording are shown in Table 5. The image density was measured by using a macbeth type densitometer with a green filter.

Table 5

| Sample No. | Amount of 4,4'-butylidenediphenol (gr.) | Amount of Phenol resin-A (gr.) | Image Density (1)*1 | Image Density (2)*2 |
|---|---|---|---|---|
| 1 | 0 | 2.5 | 0.80 | 0.80 |
| 2 | 0.5 | 2.0 | 0.85 | 0.75 |
| 3 | 1.0 | 1.5 | 0.91 | 0.68 |
| 4 | 1.5 | 1.0 | 0.95 | 0.62 |
| 5 | 2.0 | 0.5 | 0.98 | 0.55 |
| 6 | 2.5 | 0 | 1.10 | 0.21 |

*1 Image density measured immediately after recording.
*2 Image density measured after the image was preserved at 40° C and 80% RH for one month.

We claim:

1. In an electrical recording member which comprises a substrate and a recording layer overlying said substrate and containing, dispersed in a binder, a conductive agent, a leuco base and an acidic substance, whereby said leuco base and acidic substance react to produce an image upon the passage of an electric current through said recording layer, the improvement wherein said acidic substance consists essentially of a phenolic resin having a softening point of from 40° to 200° C and obtained by the polycondensation of 4,4'-isopropylidene diphenol or 4,4'-sec-butylidene diphenol with formaldehyde or acetaldehyde.

2. An image recording member according to claim 1 in which the recording layer further contains a weak acid as a color developing accelerating agent.

3. An image recording member according to claim 1 in which the conductive agent is metallic powder.

4. An image recording member according to claim 1 in which the conductive agent is at least one member selected from the group consisting of metal oxides, metal sulfides, metal phosphides, and metal halides.

5. An image recording member according to claim 1 in which the conductive agent is at least one member selected from the group consisting of zeolite minerals and zeolite-like minerals.

6. An image recording member according to claim 1 in which the conductive agent is a conductive polymer.

7. An image recording member according to claim 1 in which the leuco base is selected from the group consisting of triphenylmethane series, fluoran series, phenothiazine series, auramine series and spiropyran series dye leuco bodies.

8. An image recording member according to claim 1 in which the weight ratio of conductive agent: leuco base: phenolic resin: binder in the recording layer is 2.5 – 25: 0.25 – 5: 0.25 – 15: 0.5 – 10.

9. An image recording member according to claim 1 in which the weight ratio of conductive agent: leuco base: phenolic resin: binder in the recording layer is 3 – 15: 0.5 – 2: 0.5 – 6: 0.8 – 5.

10. An image recording member according to claim 1 in which the substrate is conductive.

11. An image recording member according to claim 2 in which the weak acid is at least one member selected from the group consisting of phenols, biphenols, diphenol methanes of the following formulas and derivatives thereof:

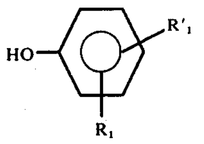

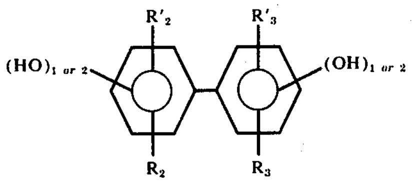

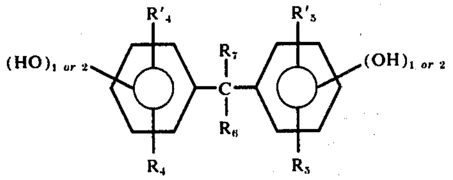

where $R_1$,$R'_1$,$R_2$,$R'_2$,$R_3$,$R'_3$,$R_4$,$R'_4$,$R_5$,$R'_5$,$R_6$ and $R_7$ are similar or dissimilar and are selected from the group consisting of hydrogen, $C_1$–$C_3$ alkyl, alkoxy, acyl, alkylamino, dialkylamino, amino, nitro, and halogen.

12. An image recording member according to claim 2 in which the weak acid is at least one member selected from the group consisting of 4-tert-butylphenol, 4-hydroxydiphenoxide, α-naphthol, β-naphthol, methyl 4-hydroxybenzoate, 4-hydroxyacetophenone, 4-tert-octylcatechol, 2,2'-dihydroxydiphenyl, 4-hydroxydiphenyloxide, 2,2'-methylene-bis(4-chlorophenol), 2,2'-methylene-bis(4-methyl-6-tert-butylphenol), 4,4'-isopropylidene diphenol, 4,4'-isopropylidene-bis(2-chlorophenol), 4,4'-isopropylidene-bis(2,6-dibromophenol), 4,4'-isopropylidene bis(2-methylphenol), 4,4'-isopropylidene bis(2,6-dimethylphenol), 4,4'-isopropylidene bis(2-tert-butylphenol), 4,4'-sec-butylidene bis(2-methylphenol), 4,4'-cyclohexylidene diphenol, 4,4'-cyclohexylidene bis(2-methylphenol), 2,2'-thiobis(4,6-dichlorophenol), and 4,4'-(1-methyl-n-hexylidene)diphenol.

13. An image recording member according to claim 2 in which the weak acid is a clay mineral.

14. An image recording member according to claim 2 in which the weak acid is an aliphatic carboxylic acid or an aromatic carboxylic acid.

15. An image recording member according to claim 2 in which the weak acid is contained in the recording layer in an amount of less than 10 parts by weight per one part by weight of the phenolic resin.

16. An image recording member according to claim 2 in which the weak acid is contained in the recording layer in an amount of less than 5 parts by weight per one part by weight of the phenolic resin.

17. An image recording member according to claim 1 in which the recording layer is a single layer containing said conductive agent, said leuco base, said phenolic resin, and said binder.

18. An image recording member according to claim 1 in which the recording layer is composed of a conduction layer containing mainly said conductive agent and an image forming layer containing mainly said leuco base and said phenolic resin.

19. In a process for conduction recording comprising contacting a stylus with a recording layer provided on a substrate having a conductive layer, said recording layer containing, dispersed in a binder, a conductive agent, a leuco base and an acidic substance;

setting a return electrode on said conductive layer; and applying an electric current to said recording layer through said stylus to cause said leuco base and said acidic substance to react and thereby form an image;

the improvement wherein said acidic substance consists essentially of a phenolic resin having a softening point of from 40° to 200° and obtained by the polycondensation of 4,4'-isopropylidene diphenol or 4,4'-sec-butylidene diphenol with formaldehyde or acetaldehyde.

20. In a process for conduction recording comprising contacting a stylus with a recording layer provided on a substrate, said recording layer containing, dispersed in a binder, a conductive agent, a leuco base and an acidic substance;

setting a return electrode on said recording layer; and applying an electrode current to said recording layer through said stylus to cause said leuco base and said acidic substance to react and thereby form an image;

the improvement wherein said acidic substance consists essentially of a phenolic resin having a softening point of from 40° to 200° C and obtained by the polycondensation of 4,4'-isopropylidene diphenol or 4,4'-sec-butylidene diphenol with formaldehyde or acetaldehyde.

21. An image recording member according to claim 4, wherein said metal oxide is an oxide of a metal selected from the group consisting of titanium, zinc, lead, tin, calcium, nickel, indium, tin-indium, molybdenum, and tungsten; wherein said metal sulfide is selected from the group consisting of zinc sulfide, calcium sulfide, copper sulfide, $Cd_4GeS_6$, $Cd_4SiS_6$, $Zn_4GeS_6$ and $Zn_4SiS_6$; wherein said metal phosphide is a member selected from the group consisting of aluminum phosphide, gallium phosphide and gallium aluminum phosphide; and wherein said metal halide is a member selected from the group consisting of copper chloride, silver chloride, silver bromide, silver iodide, thallium chloride, thallium iodide, lead chloride and cuprous iodide.

22. An image recording member according to claim 6, wherein said conductive polymer is poly-4-vinylbenzyltrimethylammonium chloride or sodium polymethylacrylate.

23. An image recording member according to claim 13, wherein said clay mineral is a member selected from the group consisting of aluminum oxide, Japanese acid clay, kaolin and silica.

24. An image recording member according to claim 1 wherein said binder is a member selected from the group consisting of polyvinyl alcohol, polyvinyl acrylamide, casein, gelatin, starch, starch derivatives, cellulose, methyl cellulose, hydroxyethyl cellulose, gum arabic, sodium alginate, zinc sodium caseinate, sodium zinc caseinate, carboxymethyl cellulose, pectin, copolymes of styrene and maleic anhydride, copolymers of vinyl methyl ether and meleic anhydride, polyacrylates, acrylate copolymers, polyethylene oxide, styrene-butadiene series emulsions, vinylchloride series emulsions and vinylacetate series emulsions.

* * * * *

UNITED STATES PATENT AND TRADEMARK OFFICE
CERTIFICATE OF CORRECTION

PATENT NO. : 4,025,399

DATED : June 7, 1977

INVENTOR(S) : MASAKAZU MATSUMOTO, ET AL

It is certified that error appears in the above-identified patent and that said Letters Patent are hereby corrected as shown below:

Column 1, line 34, change "drying" to --dry--

Column 2, line 63, change "production" to --producing--

Column 3, line 12, change "II." to --(II)-- line 17, change "III." to --(III)-- line 62, delete "(I) Conductive"

line 63, change "agent" to --(I) Conductive Agent--

Column 4, line 34, change "$(H_2O)_{16}O_{96}$" to --$(H_2O)_{16}.O_{96}$-- line 56, change "$Ba_2(Al_4Si_{12}O_{32})4H2^O$" to --$Ba_2(Al_4Si_{12}O_{32}).4H_2O$--

Column 5, change lines 23-25 to read as follows:

--Buddingtonite $NH_4AlSi_3O_8.0.5H_2O$ (2) Other zeolite-like compounds

I) Germanate $M_3[HGe_4(GeO_4)_3O_4].4H_2O$: M is a metal ion.-- line 33, change "II" to --(II)-- line 41, change "III" to --(III)-- line 49, change "1" to --(1)-- line 58, change "2" to --(2)--

UNITED STATES PATENT AND TRADEMARK OFFICE

CERTIFICATE OF CORRECTION

PATENT NO. : 4,025,399

DATED : June 7, 1977

INVENTOR(S) : MASAKAZU MATSUMOTO, ET AL

It is certified that error appears in the above-identified patent and that said Letters Patent are hereby corrected as shown below:

Column 5, line 63, change "3" to --(3)--

Column 6, line 1, change "a." to --a)-- line 7, change "b." to --b)-- line 8, change "40'" to --40-- line 19, change "1." to --1)-- line 19, insert ":" after compounds line 34, change "2." to --2)-- line 42, change "c." to --c)--

Column 7, line 5, change "d." to --d)-- about line 19, opposite "n-lauryl 4-hydroxybenzoate" in the table, insert --52-- line 43, change "i." to --i)--

Column 8, line 17, delete "ii." at the end of the line line 18, insert --ii)-- at the beginning of the line line 20, delete "iii. Organic acids"

between lines 20 and 21, insert --iii) Organic acids--

Column 12, line 68, change "=2" to --*2--

UNITED STATES PATENT AND TRADEMARK OFFICE

CERTIFICATE OF CORRECTION

PATENT NO. : 4,025,399

DATED : June 7, 1977

INVENTOR(S) : MASAKAZU MATSUMOTO, ET AL

It is certified that error appears in the above-identified patent and that said Letters Patent are hereby corrected as shown below:

Column 13, line 6, change "=3" to --*3-- line 8, change "=1,3" to --*1,3-- line 9, change "=2" to --*2--

Column 15, line 13, change "=1" to --*1-- line 13, change "=2" to --*2-- line 19, change "=1" to --*1-- line 20, change "=2" to --*2--

Signed and Sealed this

*Fourth* Day of *October 1977*

[SEAL]

*Attest:*

RUTH C. MASON
*Attesting Officer*

LUTRELLE F. PARKER
*Acting Commissioner of Patents and Trademarks*